(12) United States Patent
Balk et al.

(10) Patent No.: US 8,143,354 B2
(45) Date of Patent: *Mar. 27, 2012

(54) PROCESS FOR PREPARING ACID-TERMINATED ATRP PRODUCTS

(75) Inventors: Sven Balk, Frankfurt (DE); Gerd Loehden, Essen (DE); Christine Miess, Kahl (DE); Christine Troemer, Hammersbach (DE); Monika Maerz, Alzenau (DE)

(73) Assignee: Evonik Röhm GmbH, Darmstadt (DE)

( * ) Notice: Subject to any disclaimer, the term of this patent is extended or adjusted under 35 U.S.C. 154(b) by 206 days.

This patent is subject to a terminal disclaimer.

(21) Appl. No.: 12/373,892

(22) PCT Filed: May 15, 2007

(86) PCT No.: PCT/EP2007/054671
§ 371 (c)(1),
(2), (4) Date: Jan. 15, 2009

(87) PCT Pub. No.: WO2008/017524
PCT Pub. Date: Feb. 14, 2008

(65) Prior Publication Data
US 2009/0326163 A1 Dec. 31, 2009

(30) Foreign Application Priority Data
Aug. 9, 2006 (DE) .................. 10 2006 037 352

(51) Int. Cl.
C08F 20/44 (2006.01)
C08F 36/00 (2006.01)
C08F 8/34 (2006.01)
C08F 36/08 (2006.01)
C08F 36/06 (2006.01)
C08F 8/18 (2006.01)

(52) U.S. Cl. ............... 525/329.1; 525/329.2; 525/329.3; 525/329.8; 525/333.1; 525/333.2; 525/331.2

(58) Field of Classification Search .................. 525/343, 525/329.1, 329.2, 329.3, 329.8, 330.4, 332.8, 525/332.9, 333.1, 333.2, 333.5, 331.2; 526/212, 526/213
See application file for complete search history.

(56) References Cited

U.S. PATENT DOCUMENTS

| 5,794,403 | A | 8/1998 | Oberlander et al. |
| 6,143,848 | A * | 11/2000 | Lee et al. ............ 526/212 |
| 6,498,209 | B1 | 12/2002 | Loehden et al. |
| 6,566,441 | B1 | 5/2003 | Lohden et al. |
| 6,784,256 | B1 | 8/2004 | Lee et al. |
| 6,809,163 | B2 | 10/2004 | Schultes et al. |
| 6,989,409 | B2 | 1/2006 | Loehden et al. |
| 2007/0068088 | A1 | 3/2007 | Einfeldt et al. |
| 2007/0117948 | A1 | 5/2007 | Loehden et al. |
| 2007/0193156 | A1 * | 8/2007 | Kautz et al. |
| 2007/0193159 | A1 * | 8/2007 | Schattka et al. |
| 2007/0196655 | A1 * | 8/2007 | Schattka et al. |
| 2007/0208107 | A1 * | 9/2007 | Schattka et al. |
| 2007/0208109 | A1 * | 9/2007 | Kautz et al. |
| 2007/0259987 | A1 | 11/2007 | Schattka et al. |
| 2008/0057205 | A1 | 3/2008 | Lohden et al. |
| 2008/0237529 | A1 | 10/2008 | Schattka et al. |
| 2008/0262176 | A1 | 10/2008 | Loehden et al. |
| 2008/0292893 | A1 * | 11/2008 | Loehden et al. |
| 2008/0293854 | A1 | 11/2008 | Schattka et al. |
| 2009/0048401 | A1 | 2/2009 | Loehden et al. |
| 2009/0062508 | A1 | 3/2009 | Balk et al. |
| 2009/0275707 | A1 * | 11/2009 | Balk et al. .................. 525/418 |

FOREIGN PATENT DOCUMENTS

WO 99 20659 4/1999

OTHER PUBLICATIONS

Auke Snijder, et al., "End-Group Modification of Poly(butyl Acrylate) Prepared by Atom Transfer Radical Polymerization: Mechanistic Study Using Gradient Polymer Elution Chromatography", Journal of Polymer Science Part A, vol. 40, pp. 2350-2359, XP002447521, 2002.
U.S. Appl. No. 12/301,903, filed Nov. 21, 2008, Balk, et al.
U.S. Appl. No. 12/373,732, filed Jan. 14, 2009, Balk, et al.
U.S. Appl. No. 12/304,275, filed Dec. 11, 2008, Balk, et al.
U.S. Appl. No. 12/440,244, filed Mar. 6, 2009, Balk, et al.
U.S. Appl. No. 12/674,552, filed Feb. 22, 2010, Balk, et al.
U.S. Appl. No. 12/441,664, filed Mar. 17, 2009, Schattka, et al.
U.S. Appl. No. 12/290,880, filed Nov. 4, 2008, Einfeldt, et al.
U.S. Appl. No. 12/373,531, filed Jan. 13, 2009, Schattka, et al.
U.S. Appl. No. 12/279,197, filed Oct. 21, 2008, Roos, et al.*
U.S. Appl. No. 12/522,269, filed Jul. 7, 2009, Balk, et al.
U.S. Appl. No. 12/992,430, Nov. 12, 2010, Balk, et al.
U.S. Appl. No. 13/125,177, filed Apr. 20, 2011, Kautz, et al.
U.S. Appl. No. 13/127,533, filed May 4, 2011, Balk, et al.
U.S. Appl. No. 13/127,534, filed May. 4, 2011, Balk, et al.
U.S. Appl. No. 13/128,777, filed May 11, 2011, Balk, et al.
U.S. Appl. No. 13/128,957, filed May 12, 2011, Kautz, et al.
U.S. Appl. No. 13/127,159, filed May 2, 2011, Balk, et al.

* cited by examiner

Primary Examiner — Ling Choi
Assistant Examiner — Monique Peets
(74) Attorney, Agent, or Firm — Oblon, Spivak, McClelland, Maier & Neustadt, L.L.P.

(57) ABSTRACT

The present invention relates to the in situ acid end group functionalization of polymer chains which have been prepared by means of atom transfer radical polymerization, and to the simultaneous removal of transition metals from polymer solutions.

30 Claims, No Drawings

PROCESS FOR PREPARING ACID-TERMINATED ATRP PRODUCTS

FIELD OF THE INVENTION

The present invention relates to the synthesis of polymers having acid end groups, prepared by means of atom transfer radical polymerization (abbreviated hereinafter to ATRP). One particular aspect is the preparation of acid-telechelic polymethacrylates, polyacrylates, or polystyrenes.

One very particular aspect of the present invention is that the addition of the reagent simultaneously achieves, in one process step, removal of the transition metal compounds from the polymerization solution by means of precipitation, and salt formation from the ligands previously coordinated on the transition metal, this salt formation in turn permitting simple removal of these same entities.

ATRP is an important process for preparation of a wide variety of polymers, e.g. polyacrylates, polymethacrylates, or polystyrenes. This type of polymerization has provided considerable progress toward the objective of tailored polymers. The ATRP method was substantially developed by Prof. Matyjaszewski in the 1990s (Matyjaszewski et al., J. Am. Chem. Soc., 1995, 117, p. 5614; WO 97/18247; Science, 1996, 272, p. 866). ATRP provides narrowly distributed (homo)polymers in the molar mass region of $M_n$= from 5000 to 120 000 g/mol. One particular advantage here is that it is possible to control not only the molecular weight but also the molecular weight distribution. This is moreover a living polymerization which permits the targeted construction of polymer architectures, examples being random copolymers or block copolymer structures. Appropriate initiators can, for example, also give unusual block copolymers and star polymers. Theoretical principles of the polymerization mechanism are explained inter alia in Hans Georg Elias, Makromoleküle [Macromolecules], volume 1, 6th edition, Weinheim 1999, p. 344.

PRIOR ART

The development of an ATRP process step in which, simultaneously, the halogen at the chain ends of the polymers is removed, the transition metal is completely precipitated, the ligand is converted to an easily removed ionic form, and the chain ends can be functionalized with organic acid groups, is certainly not prior art. Indeed, this is true simply for the combination of simultaneous transition metal precipitation and acid functionalization of the chain ends.

The present invention moreover provides respectively and individually a marked improvement over the prior art in relation both to end group functionalization and to halogen removal, and also to transition metal precipitation. The prior art has not hitherto described any combination of all three functions. This specification is therefore restricted hereinafter to the aspects of end group functionalization and hydroxy-functionalized ATRP products.

The ATRP process is based on a redox equilibrium between a dormant species and an active species. The active species involves the growing, radical polymer chain, of which only a small concentration is present, and also a transition metal compound in a higher oxidation state (e.g. copper II). The dormant species preferably present is the combination of the polymer chain terminated by a halogen or by a pseudohalogen and the corresponding transition metal compound in a lower oxidation state (e.g. copper I). This applies both to actual ATRP, which is initiated using appropriately (pseudo) halogen-substituted initiators, and also to reverse ATRP as described at a later stage below, in which the halogen is not bonded to the polymer chain until the equilibrium is established. Irrespective of the process selected, the halogen atom remains at the respective chain ends after termination of the reaction. These terminal halogen atoms have many possible uses. Many specifications describe the use of these types of polymer as macroinitiator after purification or via sequential addition of further monomer fractions for the construction of block structures. A representative example to which reference may be made is U.S. Pat. No. 5,807,937 for sequential polymerization and U.S. Pat. No. 6,512,060 for the synthesis of macroinitiators.

However, a problem is that, as is well known to the person skilled in the art, these halogen-functionalized polymers are thermally unstable. In particular, polymethacrylates or polyacrylates prove to be markedly more susceptible to depolymerization when terminal halogen atoms are present. A method for removal of said terminal halogen atoms is therefore of great interest. A widely used process is based on the substitution of the halogens using metal alcoholates, with precipitation of the metal halide formed. This type of process is described by way of example in US 2005/090632. A disadvantage of said procedure is the limited availability of the metal alcoholates, and their costs, and that the process can be carried out only after purification of the polymers, in a separate process step. This method cannot moreover give direct functionalization with an acid. Similar considerations also apply to other processes for the substitution of the terminal halogen groups: azides (see Matyjeszewski et al., Macromol. Rapid Commun, 18, 1057-66, 1997) and also phosphines (Coessens, Matyjaszewski, Macromol. Sci. Pure Appl. Chem., 36, 653-666, 1999) lead only to incomplete conversions, and are very toxicologically hazardous, and have poor suitability for direct acid functionalization, and are expensive. These processes can moreover be used only in a polymer-analogous reaction after product work-up.

The invention uses a mercaptan, for example thioglycolic acid, for the substitution of the terminal halogen atoms. This type of substitution reaction is briefly described only in Snijder et al. (J. of Polym. Sci.: Part A: Polym. Chem.). The aim of this scientific publication was the functionalization of the chain ends with OH groups. The reaction is described exclusively with mercaptoethanol as reagent. No substitution with acid-functionalized mercaptans is mentioned. A further difference from the present invention is the polymer-analogous method. In the publication described, the substitution reaction is carried out only after purification of the ATRP product, in a second reaction stage. This directly gives a third, important difference from the present invention. The effect of the invention: precipitation of the transition metal compounds from the ATRP solution through addition of mercaptan reagents, is not described at all in said publication.

Other alternatives are the use of stable radicals, such as nitroxides (see, for example: Beyou et al., Macromol. Chem. Phy., 202, 974-9, 2001) to trap the chain ends present for a time in free radical form, or to use targeted recombination of the radical chain ends. Both processes require additional, time-consuming intervention in the polymerization process. An example of this is temperature increases which are disadvantageous for the technology of the process. The person skilled in the art can moreover readily see that said process neither facilitates catalyst removal nor can lead to ATRP-type polymers with narrow molecular weight distributions. Said method is often termed ATRA (atom transfer radical addition) in the literature. A variant of ATRA is the addition of reagents which decompose in situ to give two radicals, of which one in turn irreversibly traps a radical chain end and the second starts new, smaller chains. A disadvantage of this procedure, alongside the reaction rate, which is again reduced, is the poor commercial availability of the reagents required and the liberation of additional radicals, which either have to be trapped very rapidly or else lead to undesired oligomeric byproducts. Said process is described by way of example in the work of Sawamoto (Macromolecules, 31, 6708-11, 1998 and J Polym. Sci. Part A: Polym. Chem., 38, 4735-48, 2000). It should also be noted that there are also no acid-functional reagents known for these two processes.

Indirect synthesis of acid-telechelic compounds is described only in relation to a variant of ATRA-ATRC (atom transfer radical coupling). ATRC derives from Fukuda (e-Polymers, no. 013, 2002) and is described in more detail for polystyrenes by Höcker (e-Polymers, no. 049, 2005) and Matyjaszewski (Macromol. Chem. Phys., 205, 154-164, 2004). This procedure uses, in a first step, brominated initiators bearing acid groups for the ATRP of styrene. After product purification, $Cu^{(0)}$ and a ligand, for example one known from ATRP, are admixed with the system. Coupling of the two chain ends takes place with this new catalyst system, with removal of the terminal bromine atoms. The original initiator moieties, still acid-functionalized, provide the new chain ends in these polymers. However, a disadvantage is that the system is applicable only to a restricted number of monomers. For example, coupling of acrylates or methacrylates functions only when short styrene segments are incorporated at the end of the ATRP. Further disadvantages are that again the method involves separate reactions, and the addition of further copper compounds, which again require complicated removal.

In contrast, a simpler method is bilateral end group functionalization under simultaneously controlled polymerization conditions using RAFT polymerization (reversible addition fragmentation chain transfer polymerization). In this process, the radical is transferred to a specific RAFT agent which, in the further course of the polymerization, functions by way of example reciprocally as bifunctional radical transfer reagent. During the transfer here, a portion of the agent, for example an acid-functional portion, becomes positioned at the subsequent chain end. The use of these doubly acid-functionalized RAFT agents can be found by way of example in Wang et al. (Macromolecules, 38, 9518-23, 2005) and Lainet et al. (Macromolecules, 35, 6754-6, 2002), and in a variant in Lima et al. (J. of Polym. Sci., Part A: Polym. Chem., 43, 959-73, 2005). A major disadvantage of these RAFT products in comparison with ATRP products, and in particular in comparison with the polymers of the invention, is the reduced thermal stability of the residues incorporated within the polymer from the RAFT agents, these mostly involving trithiocarbonates. Other disadvantages are possible color of the product and the strong odor of residual sulfur compounds, which by way of example can be liberated during thermal degradation. In contrast to this, the thioether groups incorporated by the invention into the polymer chain have a markedly greater thermal stability. The person skilled in the art will easily discern this from comparison with the polymer properties of polymers prepared by a free-radical route, with addition of mercaptan-based regulators.

Object

It is an object of the present invention to prepare, by means of atom transfer radical polymerization (ATRP), polymers which have acid groups at more than 90% of the chain ends previously affective in polymerization.

Another object of the present invention is to prepare, by means of ATRP, polymers which contain no, or only traces of, halogens and, respectively, pseudohalogens. Another object is thus to improve the thermal stability of these polymers in comparison with halogen-containing products.

A particular object of this invention is to realize polymers which, with the exception of the end groups, correspond completely to the materials which can be prepared by means of ATRP in the prior art. Factors included here are inter alia the architecture of the polymer, the molecular weight, and the molecular weight distribution.

A particular object of this invention is to achieve the acid functionalization and the simultaneous halogen removal within the scope of a process which is easy to realize on an industrial scale and which is cost-effective. A very particular object is to achieve the functionalization without additional product work-up directly at the end of the actual ATRP process in the same reaction vessel (one-pot reaction).

A parallel object of this invention is to use the same process step simultaneously to provide an industrially realizable process for the removal of transition metal complexes from polymer solutions. At the same time, the intention is that it be possible to carry out the novel process at low cost and at high speed. A further object of the present invention was to provide a process which can be implemented without complicated reengineering, on known systems suitable for solution polymerization. A further object was to achieve particularly low residual concentrations of the transition metal complexes of below 5 ppm simply by using a filtration step.

Achievement of Object

The object has been achieved via addition of suitable acid-functionalized sulfur compounds after or during termination of the polymerization. The respective chain ends are acid-functionalized by substitution of the terminal active groups of the ATRP-synthesized polymers by the sulfur compound. At the same time, the terminal halogen atoms are removed from the polymers, the transition metal coordination compound used as catalyst is quenched, and with this the metal is almost completely removed by precipitation. This can then easily be removed by filtration.

The detailed result of addition of mercaptans to halogen-terminated polymer chains as are present during or at the end of an ATRP process, is substitution of the halogen. A thioether group thus forms at the chain end of the polymers, this being a group previously known from free-radical polymerization using sulfur-based regulators. A hydrogen halide is formed as cleavage product.

One very particular aspect of the present invention is that the addition of a reagent in one process step simultaneously removes the terminal halogen atoms from the polymer chains, with acid-functionalization of the ends of the polymer, removes the transition metal compounds by precipitation, and brings about salt formation from the ligands previously coordinated on the transition metal, this salt formation in turn permitting simple removal of the ligands from the transition metal.

The detailed result of the addition of said sulfur compound is the following: the initiator used in ATRP comprises compounds which have one or more atoms or, respectively, atom groups X which can be transferred by a radical route under the polymerization conditions of the ATRP process. On substitution of the active group X at the respective chain ends of the polymers, an acid of type X—H is liberated. The hydrogen halide that forms cannot be hydrolyzed in organic polymerization solutions and thus has particularly pronounced reactivity, which leads to protonation of the ligands described below, mostly basic, on the transition metal compound. This quenching of the transition metal complex proceeds extremely rapidly and results in direct precipitation of the transition metal compounds, which are not then subject to any masking effect.

The form in which the transition metal then precipitates is generally that in which it was used at the start of the polymerization: e.g. in the case of copper, CuBr, CuCl, or $Cu_2O$. If the conditions are such that the transition metal is simultaneously oxidized, e.g. through introduction of air or through addition of sulfuric acid, the transition metal compound also precipitates in the higher oxidation state. In contrast to oxidative precipitation here, addition according to the invention of said sulfur compounds can moreover result in almost quantitative precipitation of transition metal.

In the invention, use of an excess of as little as, for example, 1.1 equivalents of said sulfur compound, based on the active group X at the chain end of the polymer, is sufficient to achieve said effect. A corresponding situation applies, based on the ligands L: for complexes in which the transition metal and the ligand are present in the ratio 1:1, just a very slight excess of the sulfur compound is likewise sufficient to achieve complete quenching of the transition metal complex. Examples of these ligands are tris(2-aminoethyl)amine (TREN) and N,N,N',N",N"'-pentamethyldiethylenetriamine (PMDETA), described below. In the case of ligands present in the complex in a biequivalent ratio with respect to the transition metal, this invention is applicable only when the transition metal is used in a marked excess of, for example, 1:2 with respect to the active groups X. 2,2'-Bipyridine is an example of this type of ligand.

Another constituent of this invention is that the sulfur compounds used become almost completely bonded to the polymer chains, and that the residual sulfur content can be completely removed very easily by means of simple modifications in the filtration process. This method gives products which have no unpleasant odor caused by sulfur compounds.

A major advantage of the present invention is the efficient removal of the transition metal complexes from the solution. Use of the process of the invention can reduce transition metal content by at least 80%, preferably by at least 95%, and very particularly preferably by at least 99%, using a filtration process. Indeed, use of particular embodiments of the process of the invention can reduce transition metal content by more than 99.9%.

The reagents added to the polymer solution in the invention after or during termination of the polymerization preferably involve compounds containing sulfur in organically bonded form. It is particularly preferable that these sulfur-containing compounds used for the precipitation of transition metal ions or of transition metal complexes have SH groups and simultaneously organic acid groups. Very particularly preferred organic compounds that may be mentioned are acid-functionalized mercaptans and/or other functionalized or else unfunctionalized compounds which have one or more thiol groups and acid groups and/or can form corresponding thiol groups and acid groups under the solution conditions. These can involve organic compounds, such as thioglycolacetic acid or mercaptopropionic acid. The particularly preferred compounds involve compounds which are readily commercially available and are used as regulators in free-radical polymerization. Advantages of said compounds are their ready availability, their low price, and the possibility of wide variation, permitting ideal matching of the precipitation reagents to the respective polymerization system. However, the present invention is not restricted to these compounds. Instead, the decisive factor is that the precipitant used firstly has an —SH group or forms, in situ, an —SH group under the prevailing conditions of the polymer solution. Secondly, said compound has to have an organic acid group or a group which can form an organic acid group under the prevailing conditions.

In free-radical polymerization, the amount of regulators, based on the monomers to be polymerized, is mostly given as from 0.05% by weight to 5% by weight. In the present invention, the amount of the sulfur compound used is not based on the monomers, but on the concentration of the chain ends active in polymerization in the polymer solution. Chain ends active in polymerization means the entirety of dormant and active chain ends. The amounts used for this purpose of the sulfur-containing precipitants of the invention are 1.5 molar equivalents, preferably 1.2 molar equivalents, particularly preferably less than 1.1 molar equivalents, and very particularly preferably less than 1.05 molar equivalents. The remaining amounts of residual sulfur can easily be removed through modification of the subsequent filtration step.

The person skilled in the art can readily see that, when the mercaptans described are added to the polymer solution during or after termination of the polymerization, they cannot have any effect on the polymers beyond the substitution reaction described. This applies in particular to the breadth of molecular weight distributions, the molecular weight, additional functionalities, glass transition temperature or melting point in the case of semicrystalline polymers, and the architecture of the polymers.

The person skilled in the art can moreover readily see that a corresponding process whose apparatus is based exclusively on filtration of the polymer solution can readily be inserted into an industrial process without major reengineering of existing solution polymerization systems.

Another advantage of the present invention is that much more rapid work-up of the polymer solution can take place than in many established systems, by virtue of the reduction to one or at most two filtration steps.

The substitution, the precipitation, and also the subsequent filtration moreover take place at a temperature in the range from 0° C. to 120° C., these being within a familiar range of process parameters.

Adsorbents or adsorbent mixtures can be used to reduce the final traces of sulfur compounds. This can take place in parallel or in successive work-up steps. The adsorbents are known from the prior art, preferably being selected from the group of silica and/or aluminum oxide, organic polyacids, and activated charcoal (e.g. Norit SX plus from Norit).

The removal of the activated charcoal can also take place in a separate filtration step or in a filtration step simultaneous with transition metal removal. In one particularly efficient variant, the activated charcoal is not added in the form of solid to the polymer solution, but commercially available activated-charcoal-loaded filters are used for filtration (e.g. AKS 5 from Pall Seitz Schenk). It is also possible to use a combination of the addition of the acidic auxiliaries described above and activated charcoal, or addition of the auxiliaries described above and filtration through activated-charcoal-loaded filters.

The present invention provides end group functionalization of polymers with acid groups, and removal of the terminal halogen atoms, and of the transition metal complexes from any polymer solution prepared by means of ATRP processes. The possibilities provided by ATRP are briefly outlined below. However, these lists do not provide a restrictive description of ATRP and thus of the present invention. Instead, they serve to indicate the major importance and versatility of ATRP, and thus also of the present invention, for the work-up of appropriate ATRP products:

The monomers that can be polymerized by means of ATRP are well known. A few examples are listed below, but with no intention of placing any type of restriction on the present invention. The term (meth)acrylate here means the esters of (meth)acrylic acid, its meaning here being not only methacrylate, e.g. methyl methacrylate, ethyl methacrylate, etc., but also acrylate, e.g. methyl acrylate, ethyl acrylate, etc., and also mixtures of the two.

Monomers which are polymerized are selected from the group of the (meth)acrylates, such as alkyl (meth)acrylates of straight-chain, branched, or cycloaliphatic alcohols having from 1 to 40 carbon atoms, e.g. methyl (meth)acrylate, ethyl (meth)acrylate, n-butyl (meth)acrylate, isobutyl (meth)acrylate, tert-butyl (meth)acrylate, pentyl (meth)acrylate, 2-ethylhexyl (meth)acrylate, stearyl (meth)acrylate, lauryl (meth)acrylate, cyclohexyl (meth)acrylate, isobornyl (meth)acrylate; aryl (meth)acrylates, e.g. benzyl (meth)acrylate or phenyl (meth)acrylate, which respectively may be unsubstituted or may have mono- to tetrasubstituted aryl moieties; other aromatically substituted (meth)acrylates, such as naphthyl (meth)acrylate; mono(meth)acrylates of ethers, of polyethylene glycols, of polypropylene glycols, or their mixtures having from 5 to 80 carbon atoms, e.g. tetrahydrofurfuryl methacrylate, methoxy(m)ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate, and poly(propylene glycol) methyl ether (meth)acrylate. The monomer selection can also encompass respective hydroxy-functionalized and/or amino-functionalized and/or mercapto-functionalized and/or olefinically functionalized acrylates and, respectively, methacrylates, e.g. allyl methacrylate or hydroxyethyl methacrylate.

Alongside the (meth)acrylates set out above, the compositions to be polymerized can also be composed of other unsaturated monomers or comprise these. Among these are, inter alia, 1-alkenes, such as 1-hexene, 1-heptene, branched alkenes, e.g. vinylcyclohexane, 3,3-dimethyl-1-propene, 3-methyl-1-diisobutylene, 4-methyl-1-pentene, acrylonitrile, vinyl esters, e.g. vinyl acetate, in particular styrene, substituted styrenes having an alkyl substituent on the vinyl group, e.g. α-methylstyrene and α-ethylstyrene, substituted styrenes having one or more alkyl substituents on the ring, e.g. vinyltoluene and p-methylstyrene, halogenated styrenes, e.g. monochlorostyrenes, dichlorostyrenes, tribromostyrenes, and tetrabromostyrenes; heterocyclic compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinylimidazole, vinyloxolane, vinylfuran, vinylthiophene, vinylthiolane, vinylthiazoles, vinyloxazoles, and isoprenyl ethers; maleic acid derivatives, such as maleic anhydride, maleimide, methylmaleimide, and dienes, e.g. divinylbenzene, and also the respective hydroxy-functionalized and/or amino-functionalized and/or mercapto-functionalized and/or olefinically functionalized compounds. These copolymers can moreover also be prepared in such a way that they have a hydroxy functionality and/or amino functionality and/or mercapto functionality, and/or an olefinic functionality in a substituent. Examples of these monomers are vinylpiperidine, 1-vinylimidazole, N-vinylpyrrolidone, 2-vinylpyrrolidone, N-vinyl-pyrrolidine, 3-vinylpyrrolidine, N-vinylcaprolactam, N-vinylbutyrolactam, hydrogenated vinylthiazoles, and hydrogenated vinyloxazoles.

The process can be carried out in any desired halogen-free solvents. Preference is given to toluene, xylene, acetates, preferably butyl acetate, ethyl acetate, propyl acetate; ketones, preferably ethyl methyl ketone, acetone; ethers; aliphatics, preferably pentane, hexane; alcohols, preferably cyclohexanol, butanol, hexanol, or else biodiesel.

Block copolymers of AB composition can be prepared by sequential polymerization. Block copolymers of ABA or ABCBA composition are prepared by sequential polymerization and initiation using bifunctional initiators.

The polymerization can be carried out at atmospheric pressure, subatmospheric pressure, or superatmospheric pressure. The polymerization temperature is also non-critical. However, it is generally in the range from −20° C. to 200° C., preferably from 0° C. to 130° C., and particularly preferably from 50° C. to 120° C.

The number-average molar mass of the polymers obtained in the invention is preferably from 5000 g/mol to 120 000 g/mol, and particularly preferably from 7500 g/mol to 50 000 g/mol.

Polydispersity has been found to be below 1.8, preferably below 1.6, particularly preferably below 1.4, and ideally below 1.2.

The initiator used can comprise any compound which has one or more atoms or, respectively, atom groups X which can be transferred by a radical route under the polymerization conditions of the ATRP process. The active group X generally involves Cl, Br, I, SCN, and/or $N_3$. Suitable initiators generally encompass the following formulae:

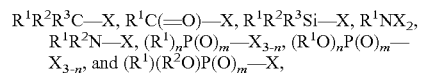

where X has been selected from the group consisting of Cl, Br, I, $OR^4$, $SR^4$, $SeR^4$, $OC(=O)R^4$, $OP(=O)R^4$, $OP(=O)(OR^4)_2$, $OP(=O)OR^4$, $O—N(R^4)_2$, CN, NC, SCN, NCS, OCN, CNO, and $N_3$ (where $R^4$ is an alkyl group of from 1 to 20 carbon atoms, where each hydrogen atom independently can have been replaced by a halogen atom, preferably fluoride or chloride, or alkenyl of from 2 to 20 carbon atoms, preferably vinyl, or alkenyl of from 2 to 10 carbon atoms, preferably acetylenyl, or phenyl, in which from 1 to 5 halogen atoms or alkyl groups having from 1 to 4 carbon atoms can be present as substituents, or aralkyl, and where $R^1$, $R^2$, and $R^3$, independently of one another, have been selected from the group consisting of hydrogen, halogens, alkyl groups having from 1 to 20, preferably from 1 to 10, and particularly preferably from 1 to 6, carbon atoms, cycloalkyl groups having from 3 to 8 carbon atoms, silyl groups, alkylsilyl groups, alkoxysilyl groups, amine groups, amide groups, COCl, OH, CN, alkenyl groups or alkynyl groups having from 2 to 20 carbon atoms, preferably from 2 to 6 carbon atoms, and particularly preferably allyl or vinyl, oxiranyl, glycidyl, alkenyl or alkenyl groups having from 2 to 6 carbon atoms, which with oxiranyl or glycidyl, aryl, heterocyclyl, aralkyl, aralkenyl (aryl-substituted alkenyl, where aryl is as defined above and alkenyl is vinyl, substituted by one or two $C_1$-$C_6$-alkyl groups, in which from one to all of the hydrogen atoms, preferably one, has/have been substituted by halogen (preferably fluorine or chlorine if one or more hydrogen atoms has/have been replaced, and preferably fluorine, bromine or bromine if one hydrogen atom has been replaced), alkenyl groups having 1 to 6 carbon atoms, substituted by from 1 to 3 substituents (preferably 1) selected from the group consisting of $C_1$-$C_4$-alkoxy, aryl, heterocyclyl, ketyl, acetyl, amine, amide, oxiranyl, and glycidyl, and m=0 or 1; m=0, 1 or 2. It is preferable that no more than two of the moieties $R^1$, $R^2$, and $R^3$ is/are hydrogen, and it is particularly preferable that at most one of the moieties $R^1$, $R^2$, and $R^3$ is hydrogen.

Among the particularly preferred initiators are benzyl halides, such as p-chloromethylstyrene, hexakis(α-bromomethyl)benzene, benzyl chloride, benzyl bromide, 1-bromo-i-phenylethane and 1-chloro-i-phenylethane. Particular preference is further given to carboxylic acid derivatives halogenated at the α position, e.g. propyl 2-bromopropionate, methyl 2-chloropropionate, ethyl 2-chloropropionate, methyl 2-bromopropionate, or ethyl 2-bromoisobutyrate. Preference is also given to tosyl halides, such as p-toluenesulfonyl chloride; alkyl halides, such as tetrachloromethane, tribromoethane, 1-vinylethyl chloride, or 1-vinylethyl bromide; and halogen derivatives of phosphoric esters, e.g. dimethylphosphonic chloride.

One particular group of the initiators suitable for the synthesis of block copolymers is provided by the macroinitiators. A feature of these is that from 1 to 3, preferably from 1 to 2, and very particularly preferably one, moiety from the group of $R^1$, $R^2$, and $R^3$ involves macromolecular moieties. These macromoieties can have been selected from the group of the polyolefins, such as polyethylene or polypropylene; polysiloxanes; polyethers, such as polyethylene oxide or polypropylene oxide; polyesters, such as polylactic acid, or from other known end group functionalizable macromolecules. The molecular weight of each of these macromolecular moieties can be from 500 to 100 000, preferably from 1000 to 50 000, and particularly preferably from 1500 to 20 000. It is also possible, for the initiation of the ATRP, to use said macromolecules which at both ends have groups suitable as initiator, e.g. in the form of a bromotelechelic compound. Using macroinitiators of this type it is possible to construct ABA triblock copolymers.

Another important group of the initiators is provided by the bi- or polyfunctional initiators. Using polyfunctional initiator molecules it is, for example, possible to synthesize star polymers. Using bifunctional initiators, it is possible to prepare tri- or pentablock copolymers and telechelic polymers. Bifunctional initiators that can be used are $RO_2C$—CHX—$(CH_2)_n$—CHX—$CO_2R$, $RO_2C$—$C(CH_3)X$—$(CH_2)_n$—C$(CH_3)X$—$CO_2R$, $RO_2C$—$CX_2$—$(CH_2)_n$—$CX_2$—$CO_2R$, RC(O)—CHX—$(CH_2)_n$—CHX—C(O)R, RC(O)—$C(CH_3)$X—$(CH_2)_n$—$C(CH_3)_3$X—C(O)R, RC(O)—$CX_2$—$(CH_2)_n$—$CX_2$—C(O)R, $XCH_2$—$CO_2$—$(CH_2)_n$—$OC(O)CH_2X$, $CH_3CHX$—$CO_2$—$(CH_2)_n$—$OC(O)CHXCH_3$, $(CH_3)_2CX$—$CO_2$—$(CH_2)_n$—$OC(O)CX(CH_3)_2$, $X_2CH$—$CO_2$—$(CH_2)_n$—$OC(O)CHX_2$, $CH_3CX_2$—$CO_2$—$(CH_2)_n$—$OC(O)CX_2CH_3$, $XCH_2C(O)C(O)CH_2X$, $CH_3CHXC(O)C(O)CHXCH_3$, $XC(CH_3)_2C(O)C(O)CX(CH_3)_2$, $X_2CHC(O)C(O)CHX_2$, $CH_3CX_2C(O)C(O)CX_2CH_3$, $XCH_2$—C(O)—$CH_2X$, $CH_3$—CHX—C(O)—CHX—$CH_3$, $CX(CH_3)_2$—C(O)—CX$(CH_3)_2$, $X_2CH$—C(O)—$CHX_2$, $C_6H_5$—CHX—$(CH_2)_n$—CHX—$C_6H_5$, $C_6H_5$—$CX_2$—$(CH_2)_n$—$CX_2$—$C_6H_5$, $C_6H_5$—$CX_2$—$(CH_2)_n$—$CX_2$—$C_6H_5$, o-, m-, or p-$XCH_2$-Ph-$CH_2X$, o-, m-, or p-$CH_3CHX$-Ph-$CHXCH_3$, o-, m-, or p-$(CH_3)_2CX$-Ph-$CX(CH_3)_2$, o-, m-, or p-$CH_3CX_2$-Ph-$CX_2CH_3$, o-, m-, or p-$X_2CH$-Ph-$CHX_2$, o-, m-, or p-$XCH_2$—$CO_2$-Ph-OC(O)$CH_2X$, o-, m-, or p-$CH_3CHX$—$CO_2$-Ph-OC(O)$CHXCH_3$, o-, m-, or p-$(CH_3)_2CX$—$CO_2$-Ph-OC(O)$CX(CH_3)_2$, $CH_3CX_2$—$CO_2$-Ph-OC(O)$CX_2CH_3$, o-, m-, or p-$X_2CH$—$CO_2$-Ph-OC(O)$CHX_2$, or o-, m-, or p-$XSO_2$-Ph-$SO_2X$ (X being chlorine, bromine, or iodine; Ph being phenylene ($C_6H_4$); R representing an aliphatic moiety of from 1 to 20 carbon atoms, of linear, branched, or cyclic structure, which can be saturated or have mono- or polyunsaturation, and which can contain one or more aromatic systems or can be free from aromatic systems, and n is a number from 0 to 20). It is preferable to use 1,4-butanediol di(2-bromo-2-methylpropionate), ethylene glycol 1,2-di(2-bromo-2-methylpropionate), diethyl 2,5-dibromoadipate, or diethyl 2,3-dibromomaleate. The subsequent molecular weight is the result of the initiator to monomer ratio, if all of the monomer is converted.

Catalysts for ATPR are listed in Chem. Rev. 2001, 101, 2921. Copper complexes are mainly described—however, other compounds used inter alia are iron compounds, cobalt compounds, chromium compounds, manganese compounds, molybdenum compounds, silver compounds, zinc compounds, palladium compounds, rhodium compounds, platinum compounds, ruthenium compounds, iridium compounds, ytterbium compounds, samarium compounds, rhenium compounds, and/or nickel compounds. It is generally possible to use any of the transition metal compounds which can form a redox cycle with the initiator or, respectively, the polymer chain which has a transferable atom group. By way of example, copper introduced into the system for this purpose can derive from $Cu_2O$, CuBr, CuCl, CuI, $CuN_3$, CuSCN, CuCN, $CuNO_2$, $CuNO_3$, $CuBF_4$, $Cu(CH_3COO)$, or $Cu(CF_3COO)$.

An alternative to the ATRP described is provided by a variant of the same: in what is known as reverse ATRP, compounds in higher oxidation states, such as $CuBr_2$, $CuCl_2$, CuO, $CrCl_3$, $Fe_2O_3$, or $FeBr_3$ can be used. In these instances, the reaction can be initiated with the aid of traditional radical generators, such as AIBN. Here, the transition metal compounds are first reduced, since they are reacted with the radicals generated by the traditional radical generators. Reverse ATRP was described inter alia by Wang and Matyjaszewski in Macromolekules (1995), vol. 28, pp. 7572ff.

A variant of reverse ATRP is provided by the additional use of metal in the oxidation state zero. The reaction rate is accelerated by what is assumed to be comproportionation with the transition metal compounds of the higher oxidation state. More details of this process are described in WO 98/40415.

The molar ratio of transition metal to monofunctional initiator is generally in the range from 0.01:1 to 10:1, preferably in the range from 0.1:1 to 3:1, and particularly preferably in the range from 0.5:1 to 2:1, with no intention of any resultant restriction.

The molar ratio of transition metal to bifunctional initiator is generally in the range from 0.02:1 to 20:1, preferably in the range from 0.2:1 to 6:1, and particularly preferably in the range from 1:1 to 4:1, with no intention of any resultant restriction.

In order to raise the solubility of the metals in organic solvents and simultaneously to avoid the formation of organometallic compounds which are more stable and therefore less active in polymerization, ligands are added to the system. The ligands also facilitate the abstraction of the transferable atom group by the transition metal compound. A list of known ligands is found by way of example in WO 97/18247, WO 97/47661, or WO 98/40415. The compounds used as ligand mostly have one or more nitrogen atoms, oxygen atoms, phosphorus atoms, and/or sulfur atoms as coordinative constituent. Particular preference is given here to nitrogen-containing compounds. Very particular preference is given to nitrogen-containing chelating ligands. Examples that may be mentioned are 2,2'-bipyridine, N,N,N', N'', N''-pentamethyldiethylenetriamine (PMDETA), tris(2-aminoethyl)amine (TREN), N,N,N', N'-tetramethylethylenediamine, or 1,1,4,7,10,10-hexamethyltriethylenetetramine. The person skilled in the art will find in WO 98/40415 useful indications of the selection and combination of the individual components.

These ligands can form coordination compounds in situ with the metal compounds, or they can be first prepared in the form of coordination compounds and then added to the reaction mixture.

The ratio of ligand (L) to transition metal depends on the number of coordination sites occupied by the ligand and on the coordination number of the transition metal (M). The molar ratio is generally in the range from 100:1 to 0.1:1, preferably from 6:1 to 0.1:1, and particularly preferably from 3:1 to 1:1, with no intention of any resultant restriction.

The decisive factor for the present invention is that the ligands are protonatable.

Preference is given to ligands present in the coordination compound in a ratio of 1:1 with respect to the transition metal. If ligands such as 2,2'-bipyridine are used, bonded in the complex in a ratio of 2:1 with respect to the transition metal, complete protonation can take place only if the amount used of the transition metal is markedly substoichiometric, for example 1:2 with respect to the active chain end X. However, this type of polymerization would be severely slowed in comparison with one using equivalent complex-X ratios.

The products worked up according to the invention have a wide field of applications. The selection of the examples does not restrict the use of the polymers of the invention. The examples are intended solely to serve as spot tests of the wide applicability of the acid-telechelic polymers described. By way of example, ATRP-synthesized polymers are used as prepolymers in hotmelt and other adhesive compositions, and in hot-melt and other sealing compositions, for polymer-analogous reactions, or to construct block copolymers. The polymers can also be used in formulations for cosmetic use, in coating materials, as dispersing agents, or as polymer additive, or in packaging.

The examples given below are given to provide better illustration of the present invention, but do not restrict the invention to the features disclosed herein.

EXAMPLES

The present examples have been based on the ATRP process. The polymerization parameters here were selected in such a way as to require working with particularly high copper concentrations: low molecular weight, 50% strength solution, and bifunctional initiator.

Inventive Example 1

15 g of n-butyl acrylate, 15.5 g of butyl acetate, 0.2 g of copper(I) oxide, and 0.5 g of PMDETA were used as initial charge in a double-walled vessel equipped with stirrer, thermometer, reflux condenser, nitrogen inlet tube, and dropping funnel, under $N_2$. The solution is stirred at 60° C. for 15 min. 0.47 g of butanediol 1,4-di(2-bromo-2-methylpropionate) is then added at the same temperature. The mixture is stirred for a polymerization time of 4 hours at 70° C. After introduction of atmospheric oxygen for about 5 min to terminate the reaction, 0.28 g of thioglycolic acid is added. The solution, previously greenish, spontaneously assumes an apricot color, and a red precipitate is formed. A pressurized filtration system is used for filtration. Average molecular weight and molecular weight distribution are then determined by GPC measurements. A dried specimen of the filtrate is then used to determine copper content by AAS and to determine acid number potentiometrically.

8 g of Tonsil Optimum 210 FF (Südchemie) are admixed with the remaining solution, and the mixture is stirred for 30 min and then filtered at superatmospheric pressure through an activated charcoal filter (AKS 5 from Pall Seitz Schenk). A colorless precipitate was previously observed to form. A specimen of this solid is isolated for further analysis. Again, AAS is used to determine the copper content of a dried specimen of the second filtrate, and a GPC measurement is made.

Comparative Example 1

15 g of n-butyl acrylate, 15.5 g of butyl acetate, 0.2 g of copper(I) oxide, and 0.5 g of PMDETA were used as initial charge in a double-walled vessel equipped with stirrer, thermometer, reflux condenser, nitrogen inlet tube, and dropping funnel, under $N_2$. The solution is stirred at 60° C. for 15 min. 0.48 g of butanediol 1,4-di(2-bromo-2-methylpropionate) is then added at the same temperature. The mixture is stirred at 70° C. for a polymerization time of 4 hours. After introduction of atmospheric oxygen for about 5 min to terminate the reaction, 8 g of Tonsil Optimum 210 FF (Südchemie) and 4% by weight of water are added to the solution and the mixture is stirred for 60 min. It is then filtered under pressure through an activated charcoal filter (AKS 5 from Pall Seitz Schenk). Average molecular weight and molecular weight distribution are then determined by GPC measurements. A dried specimen of the filtrate is then used to determine copper content by AAS and to determine acid number potentiometrically.

TABLE 1

| Example | Inventive example 1 | Comparison 1 |
| --- | --- | --- |
| Monomer | n-BA | n-BA |
| Cu concentration (Polymerization) | about 5.5 mg/g | |
| Sulfur compound | TGA | — |
| Adsorbent | — | Alox/Silica |
| Cu concentration (2nd Filtration) | 0.06 µg/g | 10 µg/g |
| Equivalents with respect to Cu | 1.09 | — |
| $M_n$ (prior to purification) | 8900 | 9800 |
| $M_w/M_n$ (prior to purification) | 1.20 | 1.18 |
| $M_n$ (after purification) | 8900 | 9800 |
| $M_w/M_n$ (after purification) | 1.19 | 1.18 |
| Acid number | 12 mg KOH/g | <0.2 mg KOH/g |

TGA = thioglycolic acid; n-BA = n-butyl acrylate; Alox = aluminum oxide

The examples clearly show that the results which are already very good using adsorbents to remove transition metal complexes (in this instance copper complexes) from polymer solutions can clearly be improved through prior precipitation using sulfur compounds.

Multiple characterizations of various constituents of the worked-up polymer solution are likewise used to demonstrate end group substitution: 1.) the copper precipitate: the red precipitate which forms on addition of the sulfur reagents exhibits extremely low sulfur content, <10 ppm, and it is therefore possible to exclude precipitation of the metal in the form of sulfide.

2.) The polymer: the elemental analysis of the polymer solution reveals very high sulfur content, even after removal of the second, colorless precipitate. Almost all of the sulfur added to the system is in turn found in the solution, and respectively, the dried product.

3.) The second, colorless precipitate: $^1$H NMR studies, and also IR spectroscopy, revealed that the precipitate involves the ammonium salt of the monoprotonated triamine PMDETA. Elemental analysis revealed that this precipitate is sulfur-free. Bromide content of from 32% by weight to 37% by weight could be demonstrated by ion chromatography, depending on specimen. This value corresponds to the content in pure PMDETA-ammonium bromide.

4.) Determination of acid number on the precipitated polymer from inventive example 1 gave a value of 12 mg KOH/g. For complete conversion, a value of 12.6 mg KOH/g would be expected for the molecular weight measured. This good agreement, within the bounds of accuracy of measurement, is an indicator of a high degree of functionalization.

The results for inventive example 1 show that appropriate sulfur compounds used even in a very small excess, based on the transition metal compound, lead to very efficient precipitation and to a high degree of functionalization. The examples also show that removal of the transition metal compounds from the solution is more efficient when using thiol-functionalized reagents than when using previously optimized work-up with adsorbents.

Comparison of the molecular weights and molecular weight distributions prior to and after work-up shows that the methods used have no effect on the characteristics of the polymer, except for the substitution of the end groups.

What is claimed is:

1. A process for the preparation of polymers having acid end groups, comprising substituting halogen atoms at polymer chain ends of one or more polymers by means of an addition of an acid-functionalized sulfur compound, while simultaneously precipitating one or more transition metal compounds of catalyst residue wherein
the one or more transition metal compounds are precipitated by means of the addition of said acid-functionalized sulfur compound and then removed by means of filtration;
the one or more polymers are prepared in a reaction vessel by means of atom transfer radical polymerization; and
the substitution of the halogen atoms and the precipitation of the one or more transition metal compounds occurs in said reaction vessel.

2. The process for the preparation of polymers having acid end groups, as claimed in claim 1, characterized in that, for the simultaneous removal of halogen atoms from polymers, over 90% of the halogen atoms are substituted through the addition of the sulfur compound.

3. The process for the preparation of polymers having acid end groups, as claimed in claim 2, characterized in that, for the simultaneous removal of halogen atoms from polymers, over 95% of the halogen atoms are substituted through the addition of the sulfur compound.

4. The process for the preparation of polymers having acid end groups, as claimed in claim 3, characterized in that the sulfur compound comprises a mercaptan or another organic compound having a thiol group.

5. The process for the preparation of polymers having acid end groups, as claimed in claim 4, characterized in that said sulfur compound has an additional functionality.

6. The process for the preparation of polymers having acid end groups, as claimed in claim 5, characterized in that the further functionality comprises an acid group or a group which under the present reaction conditions forms an acid group.

7. The process for the preparation of polymers having acid end groups, as claimed in claim 6, characterized in that the sulfur compound comprises a regulator familiar in free-radical polymerization technology.

8. The process for the preparation of polymers having acid end groups, as claimed in claim 6, characterized in that the sulfur compound comprises thioglycolacetic acid or mercaptopropionic acid.

9. The process for the preparation of polymers having acid end groups, as claimed in claim 1, characterized in that the sulfur compound is added after or during the termination of a polymerization.

10. The process for the preparation of polymers having acid end groups, as claimed in claim 1, characterized in that, based on the concentration of the chain ends previously active in polymerization, 1.5 molar equivalents of the sulfur compound are used.

11. The process for the preparation of polymers having acid end groups, as claimed in claim 10, characterized in that, based on the concentration of the chain ends previously active in polymerization, 1.1 molar equivalents of the sulfur compound are used.

12. The process for the preparation of polymers having acid end groups, as claimed in claim 1, characterized in that it involves a polymerization by the ATRP process.

13. The process as claimed in claim 12, characterized in that the transition metal compound used as a catalyst in the polymerization involves copper compounds, iron compounds, cobalt compounds, chromium compounds, manganese compounds, molybdenum compounds, silver compounds, zinc compounds, palladium compounds, rhodium compounds, platinum compounds, ruthenium compounds, iridium compounds, ytterbium compounds, samarium compounds, rhenium compounds, and/or nickel compounds.

14. The process as claimed in claim 13, characterized in that the transition metal compound used as a catalyst in the polymerization involves a copper compound.

15. The process as claimed in claim 14, characterized in that the copper compound has been added in the form of $Cu_2O$, $CuBr$, $CuCl$, $CuI$, $CuN_3$, $CuSCN$, $CuCN$, $CuNO_2$, $CuNO_3$, $CuBF_4$, $Cu(CH_3COO)$, and/or $Cu(CF_3COO)$ to the system prior to the start of the polymerization.

16. The process as claimed in claim 12, characterized in that the preceding polymerization uses an initiator which has an active group X.

17. The process as claimed in claim 16, characterized in that the active group X comprises Cl, Br, I, SCN, and/or $N_3$.

18. The process as claimed in claim 17, characterized in that the initiator can be mono-, di-, or polyfunctional with respect to the active groups.

19. The process as claimed in claim 16, characterized in that the active group X is substituted at the chain ends of the polymers by the sulfur compound to give a thioether, with liberation of an acid of type X—H.

20. The process as claimed in claim 13, characterized in that, prior to the polymerization, the catalyst is combined with a nitrogen-, oxygen-, sulfur-, or phosphorus-containing compound which can form one or more coordinative bonds to the transition metal to give a metal-ligand complex.

21. The process as claimed in claim 20, characterized in that the ligands used comprise N-containing chelating ligands.

22. The process as claimed in claim 21, characterized in that the ligand is protonated by an acid of type X—H.

23. The process as claimed in claim 22, characterized in that the protonation releases the ligand from the coordinated transition metal.

24. The process as claimed in claim 23, characterized in that the removal of the ligand precipitates the transition metal.

25. The process as claimed in claim 24, characterized in that the precipitation and the subsequent filtration reduces the metal content in the polymer solution by at least 80%.

26. The process as claimed in claim 25, characterized in that the precipitation and the subsequent filtration reduces the metal content in the polymer solution by at least 95%.

27. The process as claimed in claim 1, characterized in that the polymers are prepared through the polymerization of alkyl acrylates, of alkyl methacrylates, of styrenes, of vinyl esters, of vinyl ethers, of fumarates, of maleates, of itaconates, of acrylonitriles, and/or of other monomers polymerizable by means of ATRP, and/or mixtures composed alkyl acrylates, of alkyl methacrylates, of vinyl esters, of vinyl ethers, of fumarates, of maleates, of itaconates, of styrenes, of acrylonitriles, and/or of other monomers polymerizable by means of ATRP.

28. The process as claimed in claim 27, characterized in that the polymers are prepared through the polymerization of styrenes, of alkyl acrylates, and/or of alkyl methacrylates, and/or mixtures composed mainly of styrenes, of alkyl acrylates, and/or of alkyl methacrylates.

29. A hot-melt or other adhesive composition, or a hot-melt or other sealing composition, comprising an acid-telechelic polymer as prepared by the process claimed in claim 1.

30. A process for the preparation of polymers having acid end groups, said process comprising:
preparing one or more polymers by atom transfer radical polymerization; and
substituting halogen atoms at polymer chain ends of the one or more polymers by adding an acid-functionalized sulfur compound, while simultaneously precipitating one or more transition metal compounds of catalyst residue;
wherein the preparation of the one or more polymers, the substitution of the halogen atoms and the simultaneous precipitation of the one or more transition metal compounds occurs in one reaction vessel.

* * * * *